Jan. 14, 1964 M. J. DUNN ETAL 3,118,075
ROTARY DRIVE ELECTRICAL COUNTING IMPULSE GENERATOR
Filed Dec. 23, 1957 4 Sheets-Sheet 1

INVENTORS
MICHAEL J. DUNN
BY CLAYTON FYFE
John W. Michael
ATTORNEY

INVENTORS
MICHAEL J. DUNN
CLAYTON FYFE

BY John W. Michael
ATTORNEY

Jan. 14, 1964 M. J. DUNN ETAL 3,118,075
ROTARY DRIVE ELECTRICAL COUNTING IMPULSE GENERATOR
Filed Dec. 23, 1957 4 Sheets-Sheet 3

INVENTORS
MICHAEL J. DUNN
CLAYTON FYFE
BY John W. Michael
ATTORNEY

Jan. 14, 1964     M. J. DUNN ETAL     3,118,075

ROTARY DRIVE ELECTRICAL COUNTING IMPULSE GENERATOR

Filed Dec. 23, 1957     4 Sheets-Sheet 4

INVENTORS
MICHAEL J. DUNN
CLAYTON FYFE
BY
John W. Michael
ATTORNEY 3,118,075
ROTARY DRIVE ELECTRICAL COUNTING
IMPULSE GENERATOR
Michael J. Dunn, Menomonee Falls, and Clayton Fyfe, Milwaukee, Wis., assignors to Badger Meter Manufacturing Company, Menomonee Falls, Wis., a corporation of Wisconsin
Filed Dec. 23, 1957, Ser. No. 704,409
3 Claims. (Cl. 310—36)

This invention relates to a device for converting the kinetic energy of a rotating spindle into pulses of electrical energy. Such device is adapted for use with a flow meter of the type in which the visible counter may be located remote from the measuring mechanism for convenient reading and particularly to a device of this type which requires no source of power for operation other than that derived from the measuring mechanism.

It is the object of this invention to provide a device of this type which is accurate, reliable, economical to manufacture, and requires no auxiliary power source.

The invention includes means for the intermittent actuation of a generator by the rotating drive spindle of the measuring mechanism to convert the kinetic energy of the rotating spindle into increments of electrical energy. The increments or pulses of electrical energy are transmitted to the remotely located counting mechanism where they are re-converted into increments of kinetic energy and counted for reading at the counting mechanism.

Other objects and advantages will be pointed out in, or be apparent from the specification and claims, as will obvious modifications of the two embodiments shown in the drawings, in which:

The invention, while adaptable for various applications, was designed specifically for use with a fluid meter having a measuring mechanism mounted in a fluid flow line to measure the quantity or rate of flow. In the conventional flowmeter, the register forms a part of the measuring mechanism making it inconvenient to read since the measuring mechanism is generally located in the basement of a building. To avoid this problem, a remote counting mechanism is provided which can be mounted, for example, on the exterior of the building. An impulse generator 16 (FIG. 1) is mounted on a measuring mechanism and driven through drive spindle 18. Generator 16 converts the kinetic energy of the shaft into increments or pulses of electrical energy.

The number of pulses generated is proporational to the volume of fluid passed and such pulses are transmitted to a register by suitable wire conductors. The pulses or increments of electrical energy are re-converted at the counting mechanism into increments of kinetic energy by a relay which actuates a counter to indicate the amount of fluid passed by the measuring mechanism.

Figures 1, 6:
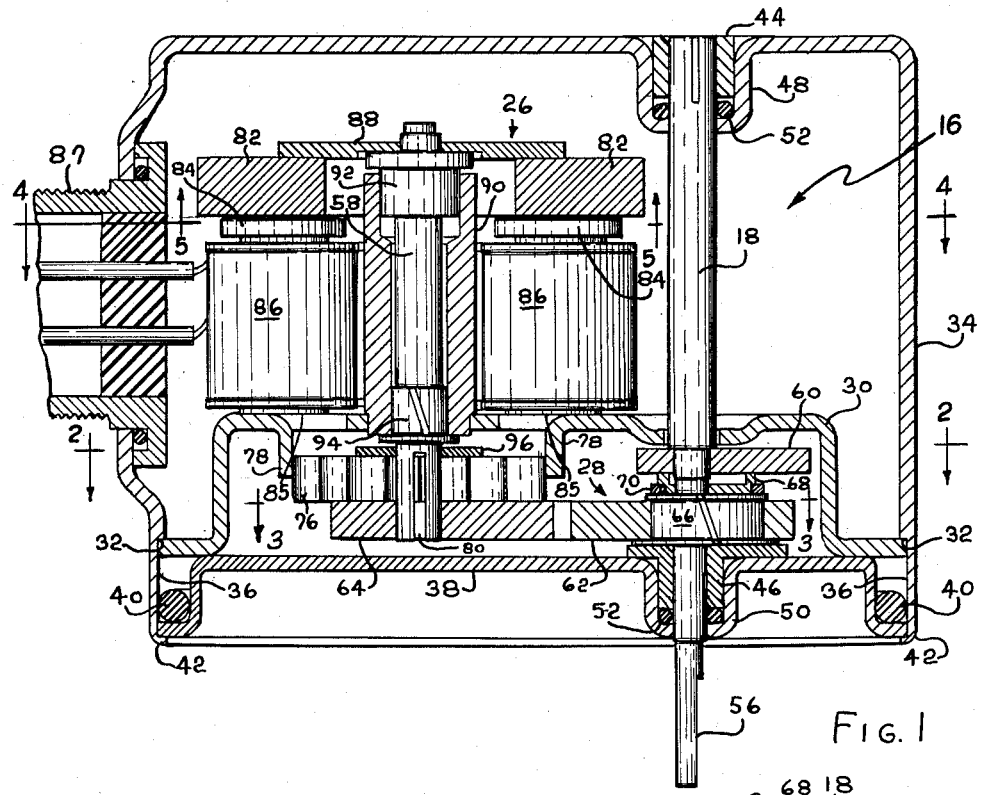
FIG. 1 is a vertical sectional view taken through the center of the impulse generator.
FIG. 6 is a fragmentary sectional view showing the details of the eccentrically mounted spur gear segment.

As shown in FIG. 1, impulse generator 16 includes a generator mechanism 26 and an actuating mechanism 28 mounted on a bracket 30 seated on shoulder 32 formed in a housing 34 at opening 36 in the bottom of the housing. The bracket 30 and mechanism mounted thereon are sealed within housing 34 by a bottom plate 38 and an O-ring sealing member 40. Bottom plate 38 holds bracket 30 securely against shoulder 32 by means of edge 42 of the housing spun or otherwise deformed over the peripheral edge of the bottom plate.

Drive spindle 18 is journaled in bearings 44 and 46 which are pressed into depending bushings 48 and 50 formed in the top of housing 34 and mounting bracket 30, respectively. The drive spindle is sealed in such bushings by O-ring sealing members 52 positioned between the bottom of each bushing and the lower end of each bearing. Spindle 18 is driven from its lower end 56 by measuring mechanism 10 of conventional construction, the details of which are not shown. The supply of kinetic energy available at rotating spindle 18 (as measuring mechanism 10 is actuated by fluid flowing therethrough) is converted into increments of kinetic energy at the generator shaft 58 by actuating mechanism 28.

Figure 3:
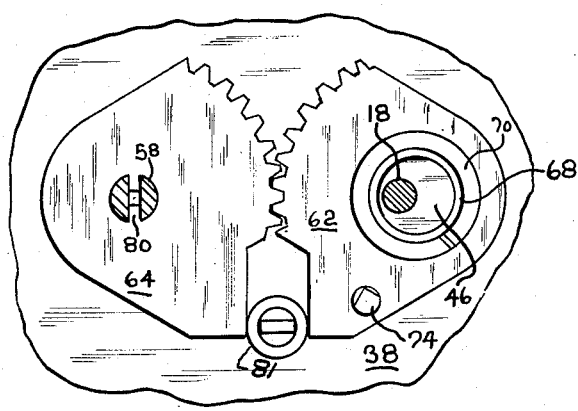
FIG. 3 is a horizontal sectional view taken on line 3—3 of FIG. 1.

Actuating mechanism 28 (FIGS. 1, 2 and 3) includes a trip pawl 60 mounted on spindle 18 which intermittently actuates generator shaft 58 by means of a pair of mating spur gear sectors 62 and 64. Gear sector 62 is mounted for reciprocal swinging movement about an axis eccentric of the axis of spindle 18. As shown in FIG. 6, gear sector 62 is mounted on a split bearing 66 held on the eccentrically formed upper portion 68 of bearing 46 by a snap ring 70 seated in a groove at the top of portion 68.

Figure 2:
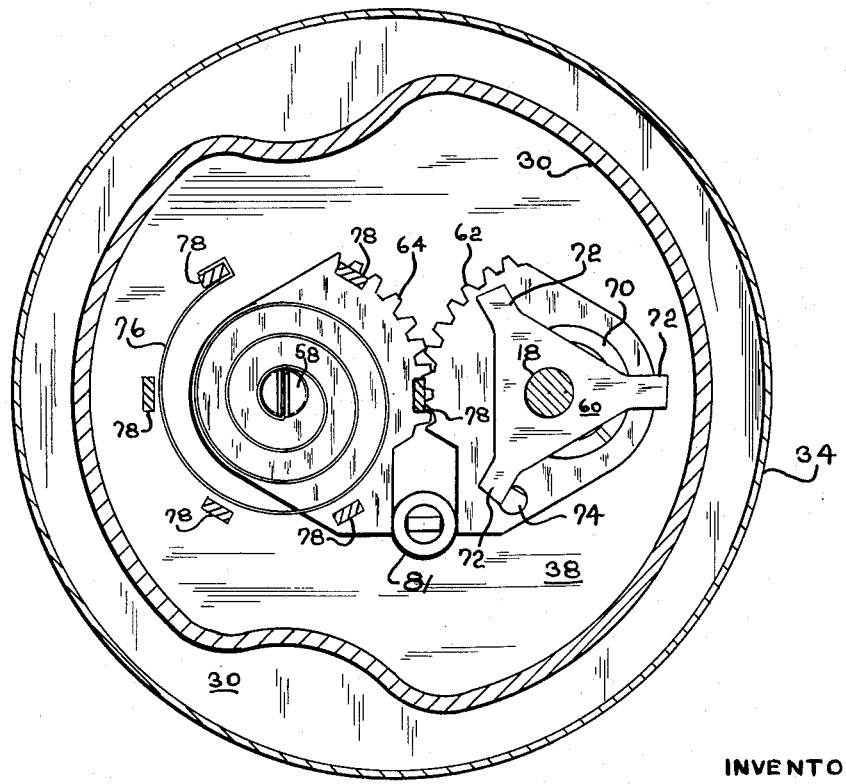
FIG. 2 is a horizontal sectional view taken on line 2—2 of FIG. 1.

Trip pawl 60 (FIG. 2) has three equally angularly spaced arms 72 for engagement with a trip pin 74 extending from the upper face of gear sector 62. As trip pawl 60 is rotated counterclockwise, as viewed in FIG. 2, one arm 72 thereof will engage pin 74 to pivot spur gear sector 62 which, in turn, pivots spur gear 64 mounted on generator spindle 58 to thereby pivot the generator spindle against the bias of a spiral spring 76. Spring 76 is centered by lugs 78 depending from bracket 30 and held between one lug 78 and a slot 80 in the generator spindle (FIG. 2). Due to the eccentric relationship of the drive spindle 18 and gear sector 62 the arms 72 of pawl 60 will disengage trip pin 74 after 60 degrees of rotation allowing the spur gears (and generator armature) to snap back against stop member 81 under the bias of spring 76. Thus, the kinetic energy of the rotating pawl 60 is stored as potential energy in spring 76 and then converted into increments of kinetic energy as arms 72 of the pawl slide off trip pin 74 on gear sector 62. It is noted (FIGS. 2 and 3) that trip pin 74 is flattened on two sides to provide instantaneous disengagement of the two parts.

Figure 7:
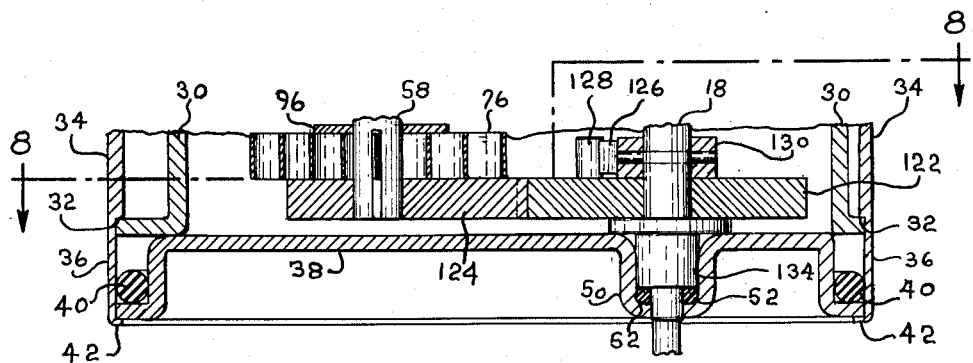
FIG. 7 is a fragmentary view similar to FIG. 1 showing a modification of the means for intermittently actuating the impulse generator.
Figure 8:
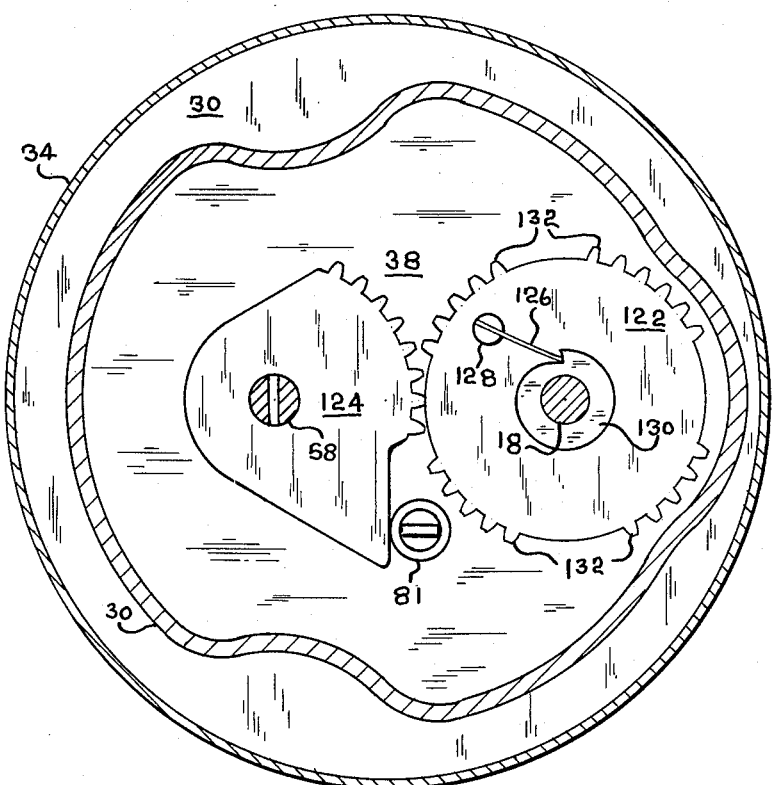
FIG. 8 is a horizontal sectional view taken along line 8—8 of FIG. 7.

A modified and somewhat simplified arrangement for intermittently actuating generator spindle 58 to convert the kinetic energy of drive spindle 18 into increments of kinetic energy at the generator spindle is shown in FIGS. 7 and 8. The modification includes a rotating spur gear 122 concentrically mounted on spindle 18 which intermittently actuates generator spindle 58 by means of a reciprocating spur gear sector 124 mounted on spindle 58. Gear 122 is driven by shaft 18 by means of a ratchet spring 126 fastened to gear 122 by a pin 128 and engaged by a notched ratchet bushing 130 keyed to spindle 18. The ratchet drive shown permits actuation of the generator only by rotation of the drive spindle in one direction and thereby prevents damage to the gears as a result of improper installation or tampering with the mechanism prior to installation. Gear 122 has four equally angularly spaced sets of teeth 132 for engagement with its mating gear sector 124. As gear 122 is rotated counterclockwise, as viewed in FIG. 8, one set of teeth 132 thereon will engage gear sector 124 and pivot it to thereby pivot the generator spindle against the bias of spiral spring 76 until the gears become disengaged allowing gear sector 124 (and generator spindle) to snap back against stop member 81 under the bias of spring 76. The sets of teeth on gear 122 are spaced a sufficient angular distance apart to allow gear 124 to snap back without interference with the next set of teeth which move into engagement with gear 124 to repeat the action as gear 122 continues to rotate. Thus, the kinetic energy of the rotating gear 122 is stored as potetial energy in spring 76 and then converted into increments of kinetic energy as successive sets of teeth 132 engage and slide free of reciprocating gear sector 124. It will be noted that a somewhat simplified gland bearing 134 may be used to journal the lower end of drive spindle 18 in the modification described above.

Figure 5:
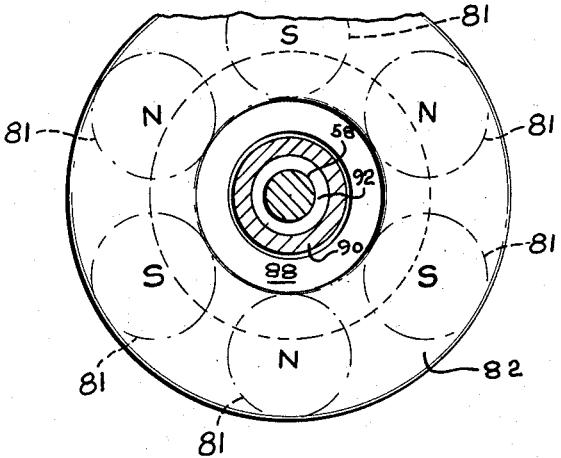
FIG. 5 is a horizontal sectional view taken on line 5—5 of FIG. 1.
Figure 4:
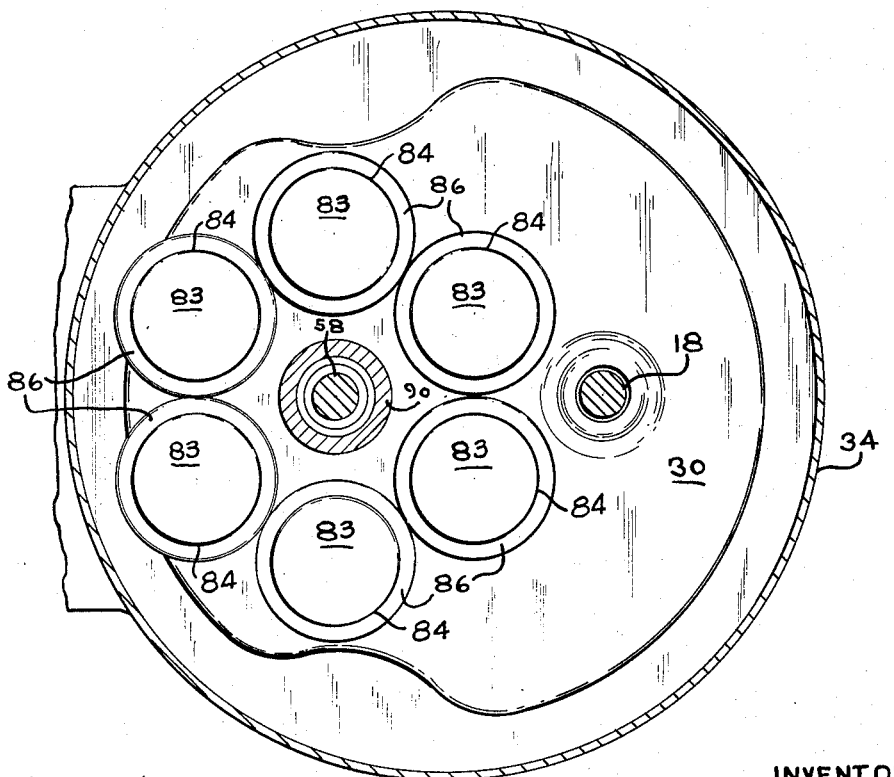
FIG. 4 is a horizontal sectional view taken on line 4—4 of FIG. 1.

Impulse generator 16 for converting the increments of kinetic energy at generator spindle 58 into increments or pulses of electrical energy includes a pivotally mounted permanent magnet member 82 having six pole faces 81 (as shown in dotted lines in FIG. 5). Such pole faces are spaced from and are in juxtaposition with six stationary pole pieces 84 mounted on bracket 30 in an equally angularly spaced circle about the axis of the generator spindle. Pole pieces 84 have end faces 83 lying opposite magnet pole faces 81 (FIG. 4) and end faces 85 which abut bracket 30 (FIG. 1). Ring-shaped magnet member 82 is preferably of ceramic material containing permanently magnetizable portions arranged and magnetized to form six equally angularly spaced magnetic poles of alternately opposite polarity. Pole pieces 84 are provided with coils 96 (one of each pole piece) interconected in series from conductors 20 leading from the generator housing through a sealed bushing assembly 87. Bracket 30 is of mild steel or other magnetic material to provide a good magnetic path between the bottom ends of the pole pieces. Magnet member 82 is mounted on spindle 58 by a magnet mounting washer 88 fastened to the magnet by a suitable adhesive and to the upper end of the spindle by staking or any other suitable means. The spindle and magnet assembly is supported by a bearing post 90 mounted on bracket 30. The spindle is journaled in bearings 92 and 94, pressed into the open ends of post 90. A spacer washer 96 is mounted on spindle 58 between spring 76 and bearing 94 to limit upward axial movement of the spindle.

Each time the magnetic poles in magnet member 82 are rotated slowly 60 degrees out of alignment with stationary pole pieces 84 and are allowed to snap under force of spring 76 back into alignment with such pole pieces, an electromotive force is induced in the coils by the relative movement of such coils at right angles to the magnetic fields of the permanent magnets in member 82. While this arrangement utilizes stationary conductors (coils) and movable magnetic fields to induce an electromotive force it should be understood that such a force could be induced by the reverse arrangement wherein the magnet field is stationary and a conductor is moved with respect thereto, such arrangement being within the scope of this invention.

We claim:

1. A device for converting the kinetic energy of a rotating spindle into pulses of electrical energy comprising, a rotating spur gear driven by said spindle, a reciprocating spur gear driven by said rotating gear, spring means for biasing said reciprocating gear in one direction, said reciprocating gear driven by said rotating gear during only a portion of each rotation of said rotating gear to intermittently actuate said reciprocating gear in the other direction against the bias of said spring means to thereby convert the kinetic energy of the rotating spindle into increments of kinetic energy, and means operated solely by said increments of kinetic energy of the reciprocating gear for converting part of such energy into pulses of electrical energy, said last stated means including a magnetic member having a plurality of equally angularly spaced permanently magnetized poles of alternately opposite polarity, a plurality of pole pieces having series connected coils mounted thereon, said pole pieces lying in the magnetic fields of said permanently magnetized poles, and a rotatably mounted generator spindle actuated by said reciprocating spur gear to impart relative reciprocal movement between said magnetic member and said pole pieces.

2. A device for converting the kinetic energy of a rotating spindle into pulses of electrical energy comprising:

a magnet member, said magnet member having a plurality of permanent magnets carried thereby, said magnets have pole faces angularly spaced with alternately opposite polarity and lying in a common plane;

a pole piece for each of said magnets, each of said pole pieces having a pair of end faces, one end face of each pole piece being in operative association with said magnet pole faces and lying in a common plane parallel to the common plane of said magnet pole faces;

and actuating means operated by said rotating spindle to momentarily accelerate said magnet member and pole pieces into relative movement with respect to each other, the relative paths of movement of said magnet member and pole pieces being in said common planes of said pole piece end faces and said magnet pole faces.

3. A device for converting the kinetic energy of a rotating spindle into pulses of electrical energy comprising:

a magnet member, said magnet member having a plurality of permanent magnets carried thereby, said magnets having pole faces angularly spaced with alternate opposite polarity and lying in a common plane;

a pole piece for each of said magnets with the axes of said pole pieces parallel with each other, each of said pole pieces having a pair of end faces, one end face of each pole piece being in operative association with said magnet pole faces and lying in a common plane parallel to the common plane of said magnet pole faces;

a common magnetic conductor interconnecting the other end faces of said pole pieces;

and actuating means operated by said rotating spindle to momentarily accelerate said magnet member with a pivotal action, the pivotal axis of said magnet member being parallel to the axes of said pole pieces whereby said magnet pole faces will be accelerated in a plane which lies parallel to the common plane of said pole piece end faces.

References Cited in the file of this patent

UNITED STATES PATENTS

| | | |
|---|---|---|
| 753,690 | Falcone | Mar. 1, 1904 |
| 2,216,016 | Marsh | Sept. 24, 1940 |
| 2,299,497 | Rosenthal | Oct. 20, 1942 |
| 2,491,902 | Ostline | Dec 20, 1949 |
| 2,522,734 | Wood | Sept. 19, 1950 |
| 2,815,477 | Dunn | Dec. 3, 1957 |
| 2,902,878 | Cupak | Sept. 8, 1959 |

FOREIGN PATENTS

| | | |
|---|---|---|
| 871,786 | Germany | Mar. 26, 1953 |